US012688111B2

(12) United States Patent (10) Patent No.: US 12,688,111 B2
Heyl (45) Date of Patent: Jul. 21, 2026

(54) METHOD FOR CARRYING OUT DATA PROCESSING

(71) Applicant: Robert Bosch GmbH, Stuttgart (DE)

(72) Inventor: Andreas Heyl, Weil der Stadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 157 days.

(21) Appl. No.: 18/331,329

(22) Filed: Jun. 8, 2023

(65) Prior Publication Data

US 2023/0401140 A1 Dec. 14, 2023

(30) Foreign Application Priority Data

Jun. 10, 2022 (DE) ..................... 10 2022 205 918.2

(51) Int. Cl.
G06F 11/3604 (2025.01)
(52) U.S. Cl.
CPC ................................ G06F 11/3604 (2013.01)
(58) Field of Classification Search
None
See application file for complete search history.

(56) References Cited

U.S. PATENT DOCUMENTS

| | | | | |
|---|---|---|---|---|
| 11,977,605 B2 * | 5/2024 | Gottschlich | ............... | G06F 8/75 |
| 2006/0248505 A1 * | 11/2006 | Tsukamoto | ........... | G06F 11/366 |
| | | | | 717/101 |
| 2015/0331416 A1 * | 11/2015 | Feniello | ................. | B25J 9/1661 |
| | | | | 700/250 |
| 2023/0176829 A1 * | 6/2023 | Rahmani | ................. | G06F 40/40 |
| | | | | 717/110 |
| 2023/0244452 A1 * | 8/2023 | Li | .......................... | G06N 3/088 |
| | | | | 717/106 |

* cited by examiner

*Primary Examiner* — Lewis A Bullock, Jr.
*Assistant Examiner* — Mark A Gooray
(74) *Attorney, Agent, or Firm* — NORTON ROSE FULBRIGHT US LLP

(57) ABSTRACT

A method for carrying out data processing. The method includes: creating, by one or more human programmers, a first computer program for a predetermined data processing task; creating a plurality of second computer programs for the predetermined data processing task, wherein each of the computer programs is created by an artificial intelligence; processing an input by the first computer program to ascertain a first processing result, and processing the input by each of the plurality of second computer programs to ascertain a respective second processing result; ascertaining a number of computer programs among the second computer programs whose second processing result contradicts the first processing result; checking whether the number of computer programs among the second computer programs whose second processing result contradicts the first processing result is greater than a predetermined threshold, which is greater than or equal to two; and initiating a safety measure.

8 Claims, 4 Drawing Sheets

Fig. 3

METHOD FOR CARRYING OUT DATA PROCESSING

CROSS REFERENCE

The present application claims the benefit under 35 U.S.C. § 119 of German Patent Application No. DE 10 2022 205 918.2 filed on Jun. 10, 2022, which is expressly incorporated herein by reference in its entirety.

FIELD

The present invention relates to methods for carrying out data processing.

BACKGROUND INFORMATION

In safety-critical applications, e.g., when controlling a vehicle, very high reliability of the control software used is required. One way to increase the reliability of software through redundancy is the use of N-version programming. However, N-version programming is very complex since several versions of the same program must be written by different development teams. In addition, it has been found that the software versions generated in this way are far less independent than expected and hoped; more than two versions thus need to be generated in some circumstances in order to achieve sufficient diversity.

More efficient approaches to increase the reliability of software are therefore desirable.

SUMMARY

According to various embodiments of the present invention, a method for carrying out data processing is provided, comprising creating, by one or more human programmers, a first computer program for a predetermined data processing task; creating a plurality of second computer programs for the predetermined data processing task, wherein each of the computer programs is created by an artificial intelligence; processing an input by the first computer program to ascertain a first processing result, and processing the input by each of the plurality of second computer programs to ascertain a respective second processing result; ascertaining a number of computer programs among the second computer programs whose second processing result contradicts the first processing result; checking whether the number of computer programs among the second computer programs whose second processing result contradicts the first processing result is greater than a predetermined threshold, which is greater than or equal to two; and initiating a safety measure if the number of computer programs among the second computer programs whose second processing result contradicts the first processing result is greater than the predetermined threshold.

The method described above makes it possible to increase the reliability of data processing or to fulfill stricter safety requirements with little effort since computer programs can be created by means of artificial intelligence with significantly less effort than by human programmers. The risk of the possibly lower quality of the AI-generated computer programs is taken into account in that the human-generated computer program is more strongly weighted in the sense that the safety measure is (only) initiated if the results of several or even significantly more AI-generated computer programs contradict the processing result of the human-generated computer program. The threshold may, for example, be two, three, or even higher, e.g., depending on the expected quality of the AI-generated computer programs.

Various exemplary embodiments of the present invention are specified below.

Exemplary Embodiment 1 is a method for carrying out data processing as described above.

Exemplary Embodiment 2 is a method according to Exemplary Embodiment 1, comprising using the first processing result as a result of the processing if the ascertained number is less the predetermined threshold.

In other words, the processing result of the human-generated computer program will be trusted unless the processing results of a high number (e.g., two or more, three or more, etc.) of AI-generated computer programs contradict the processing result of the human-generated computer program.

Exemplary Embodiment 3 is a method according to Exemplary Embodiment 1 or 2, comprising, for each input of several inputs, processing the input by the first computer program to ascertain a first processing result for the input, and processing the input by each of the plurality of second computer programs to ascertain a respective second processing result for the input; and excluding one of the second computer programs from processing subsequent inputs, which second computer program has in each case produced, for a number of inputs of several inputs that exceeds a further predetermined threshold, a second processing result that contradicts the respective first processing result, although the number of computer programs among the second computer programs whose second processing result for the input contradicts the first processing result is not greater than the predetermined threshold.

It can thus be avoided that an AI-generated computer program that has produced false results more often (in the sense that it (presumably) erroneously contradicted the first computer program) causes the safety measure to be initiated as a result of another incorrect processing result for a subsequent input, although this is not appropriate at all.

Exemplary Embodiment 4 is a method according to Exemplary Embodiment 3, comprising re-training the artificial intelligence if one of the second computer programs has in each case produced, for a number of inputs of several inputs that exceeds the further predetermined threshold, a second processing result that contradicts the respective first processing result, although the number of computer programs among the second computer programs whose second processing result for the input contradicts the first processing result is not greater than the predetermined threshold.

An AI-generated program that more often produces incorrect processing results, is thus taken as an indication that the (respective) AI has not yet been sufficiently trained. The reliability for further applications of that AI can thus be further increased.

Exemplary Embodiment 5 is a method according to one of Exemplary Embodiments 1 to 4, comprising, for each input of several inputs, selecting a portion of the plurality of second computer programs; processing the input by the first computer program to ascertain a first processing result, and processing the input by each second computer program of the selected portion to ascertain a respective second processing result; ascertaining a number of computer programs among the second computer programs of the selected portion whose second processing result contradicts the first processing result; checking whether the number of computer programs among the second computer programs of the selected portion whose second processing result contradicts the first processing result is greater than a predetermined threshold, which is greater than or equal to two; and initiating a safety measure if the number of computer programs among the second computer programs of the selected portion whose second processing result contradicts the first processing result is greater than the predetermined threshold.

In particular, the number of AI-generated computer programs used to check the plausibility of the first processing result for various inputs can thus be adjusted (e.g., dynamically), for example depending on a respective safety requirement (or integrity requirement) for the input. The resources that are utilized for a respectively desired reliability can thus to be optimized. If the requirements increase, AI processing paths (i.e., processing paths with AI-generated computer programs) could be added, for example.

Exemplary Embodiment 6 is a method according to one of Exemplary Embodiments 1 to 5, wherein the safety measure comprises discarding the first processing result.

This prevents the first processing result, for which the assumption that it is reliable is not justified, from resulting in damage or hazards. For example, the data processing task is a task within the framework of controlling a robotic device. Accidents as a result of incorrectly controlling the robotic device can thus be avoided.

Exemplary Embodiment 7 is a method according to one of Exemplary Embodiments 1 to 5, wherein the safety measure comprises that instead of the first processing result, a safe default value is used as the processing result.

In other words, a processing result is assumed that results in the safest possible behavior, e.g., of a controlled robotic device. For example, a vehicle can be decelerated, even if the first processing result does not indicate that this is required. In general, a system (e.g., a system controlled on the basis of data processing) can be transferred into a safe state.

Exemplary Embodiment 8 is a method according to one of Exemplary Embodiments 1 to 7, wherein the safety measure comprises verifying the correct functioning of the first computer program.

The AI-generated computer programs thus help to find and fix bugs in the human-generated computer program.

Exemplary Embodiment 9 is a data processing system configured to process an input by a human-generated first computer program to ascertain a first processing result, and to process the input by each of a plurality of AI-generated second computer programs to ascertain a respective second processing result; to ascertain a number of computer programs among the second computer programs whose second processing result contradicts the first processing result; to check whether the number of computer programs among the second computer programs whose second processing result contradicts the first processing result is greater than a predetermined threshold, which is greater than or equal to two; and to initiate a safety measure if the number of computer programs among the second computer programs whose second processing result contradicts the first processing result is greater than the predetermined threshold.

Exemplary Embodiment 10 is a computer program comprising instructions that, when executed by a processor, cause the processor to process an input by a human-generated first computer program to ascertain a first processing result, and to process the input by each of a plurality of AI-generated second computer programs to ascertain a respective second processing result; to ascertain a number of computer programs among the second computer programs whose second processing result contradicts the first processing result; to check whether the number of computer programs among the second computer programs whose second processing result contradicts the first processing result is greater than a predetermined threshold, which is greater than or equal to two; and to initiate a safety measure if the number of computer programs among the second computer programs whose second processing result contradicts the first processing result is greater than the predetermined threshold.

Exemplary Embodiment 11 is a computer-readable medium that stores the instructions that, when executed by a processor, cause the processor to process an input by a human-generated first computer program to ascertain a first processing result, and to process the input by each of a plurality of AI-generated second computer programs to ascertain a respective second processing result; to ascertain a number of computer programs among the second computer programs whose second processing result contradicts the first processing result; to check whether the number of computer programs among the second computer programs whose second processing result contradicts the first processing result is greater than a predetermined threshold, which is greater than or equal to two; and to initiate a safety measure if the number of computer programs among the second computer programs whose second processing result contradicts the first processing result is greater than the predetermined threshold.

In the FIGURES, similar reference signs generally refer to the same parts throughout the various views. The FIGURES are not necessarily to scale, wherein emphasis is instead generally placed on representing the principles of the present invention. In the following description, various aspects are described with reference to the FIGURES.

BRIEF DESCRIPTION OF THE DRAWINGS

FIG. 3 illustrates the use of a human-generated computer program in combination with AI-generated computer programs, according to an example embodiment of the present invention.

DETAILED DESCRIPTION OF EXAMPLE EMBODIMENTS

The following detailed description relates to the FIGURES, which show, for clarification, specific details and aspects of this disclosure in which the present invention may be implemented. Other aspects can be used, and structural, logical, and electrical changes can be made without departing from the scope of protection of the present invention. The various aspects of this disclosure are not necessarily mutually exclusive since some aspects of this disclosure can be combined with one or more other aspects of this disclosure in order to form new aspects.

Various examples are described in more detail below.

Figure 1:
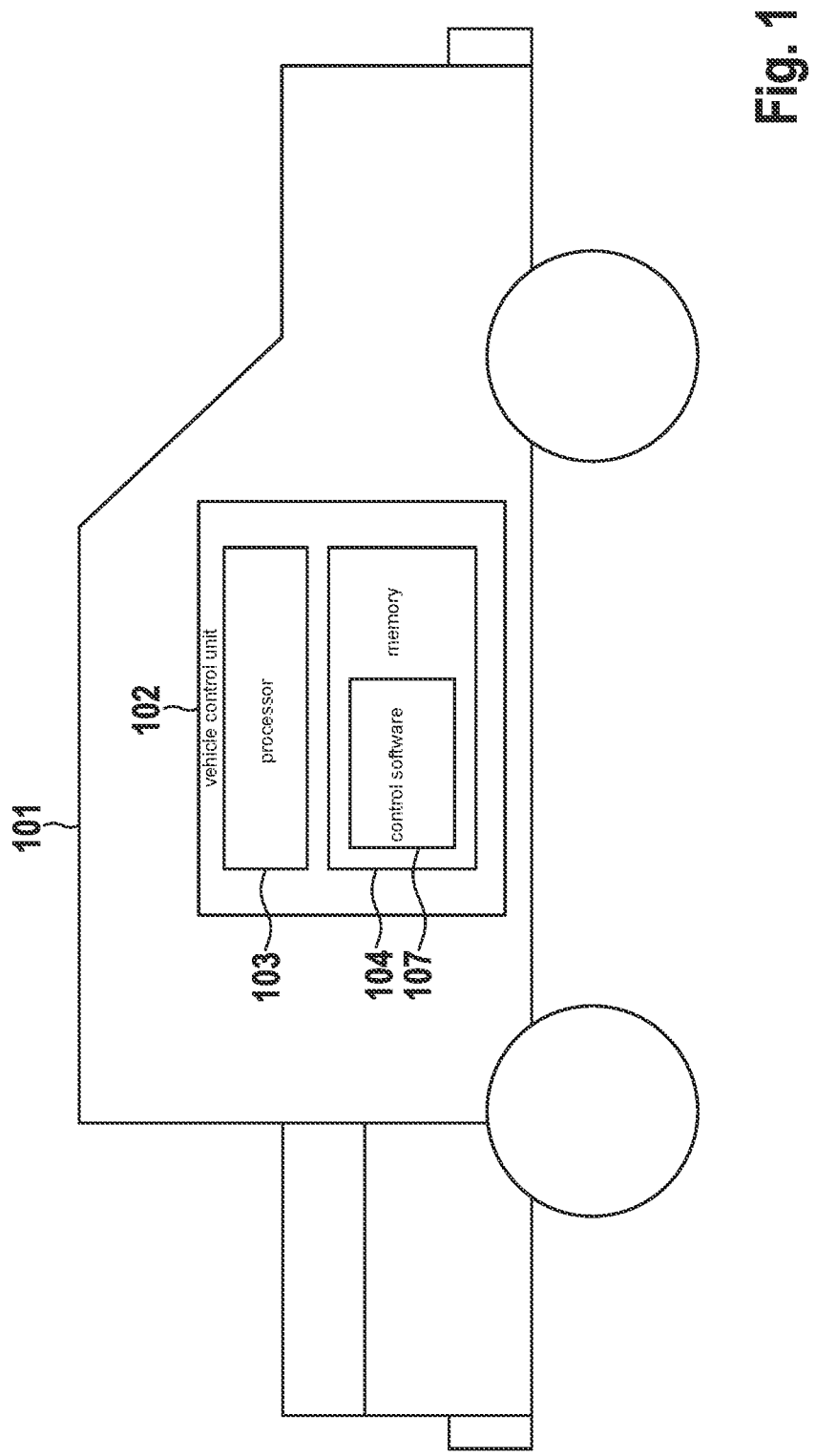
FIG. 1 shows a vehicle according to an example embodiment of the present invention.

FIG. 1 shows a vehicle 101.

In the example of FIG. 1, a vehicle 101, e.g., a car or truck, is provided with a vehicle control unit (e.g., consisting of one or more electronic control units (ECUs)) 102.

The vehicle control unit 102 comprises data processing components, e.g., a processor (e.g., a CPU (central processing unit)) 103 and a memory 104 for storing control software 107 according to which the vehicle control unit 102 operates, and data that are processed by the processor 103. The vehicle control unit 102 may comprise several data processing devices (e.g., ECUs) connected to one another via an internal communication network (e.g., a CAN bus). These data processing devices may also execute the control software 107 in a distributed manner.

For example, the stored control software (computer program) comprises instructions that, when executed by the processor (or by several processors in a distributed manner), cause the processor 103 (or the processors) to carry out driver assistance functions (or also to collect trip data) or to even autonomously control the vehicle.

The control software must perform various tasks for this purpose. For each of these tasks, the control software contains a computer program (which may also be a subprogram or a function, etc. of a larger computer program), e.g., a computer program for carrying out particular data processing, e.g., calculating a target speed or also classifying a detected object, etc.

In a safety-critical context, such as the control of a vehicle, such a computer program has high requirements for the correctness of the results produced by the computer program.

According to various embodiments, for a computer program written by one or more human programmers for a predetermined task specified by a task specification, several further computer programs for the same task specification are therefore generated by means of artificial intelligence. With these further, AI-generated computer programs, results of the human-generated computer program are checked for plausibility, i.e., redundancy is created.

Figure 2:
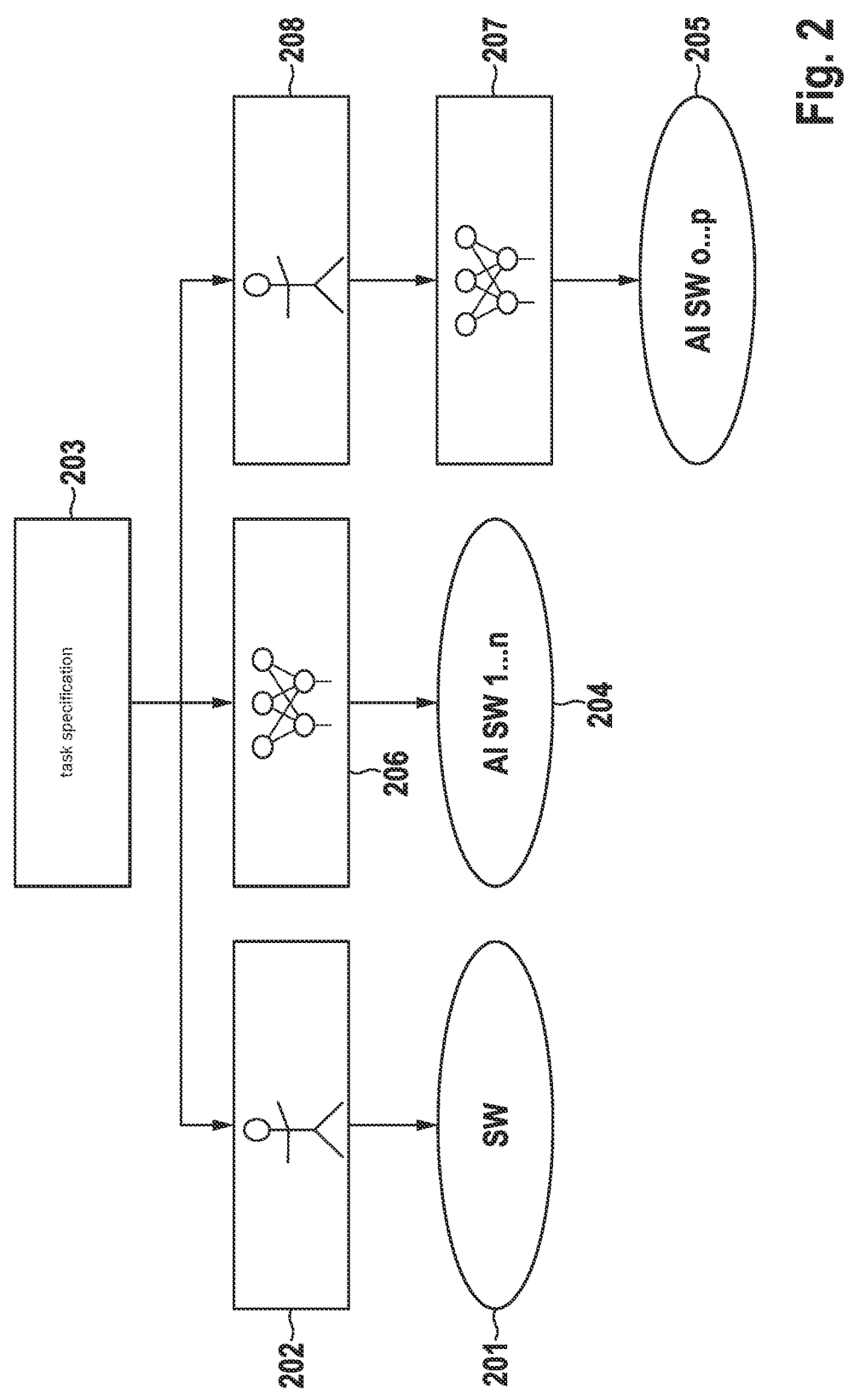
FIG. 2 illustrates the generation of a first computer program by one or more human programmers and the generation of further computer programs by AI tools, according to an example embodiment of the present invention.

FIG. 2 illustrates the generation of a first computer program 201 by one or more human programmers 202 for a task specification 203 and the generation of further computer programs 204, 205 by AI tools 206, 207, i.e., by means of artificial intelligence, wherein a first portion 204 of the AI-generated computer programs is generated directly from the task specification 203, and a second portion 205 of the AI-generated computer programs is generated from a task specification 208 that is adjusted or prepared (e.g., translated into an input syntax of the respective AI tool, i.e., it is readable by the AI tool) by one or more programmers.

For example, the task specification 203 specifies particular requirements or describes a system model. The task specification 203 (or also function specification) can also be used by human programmers by using system models or autocoders, i.e., programs that enable code to be generated from system models (e.g., ASCET).

The generated program versions 201, 204, 205 can then be used together in software, e.g., in the control software 107.

Figure 3:
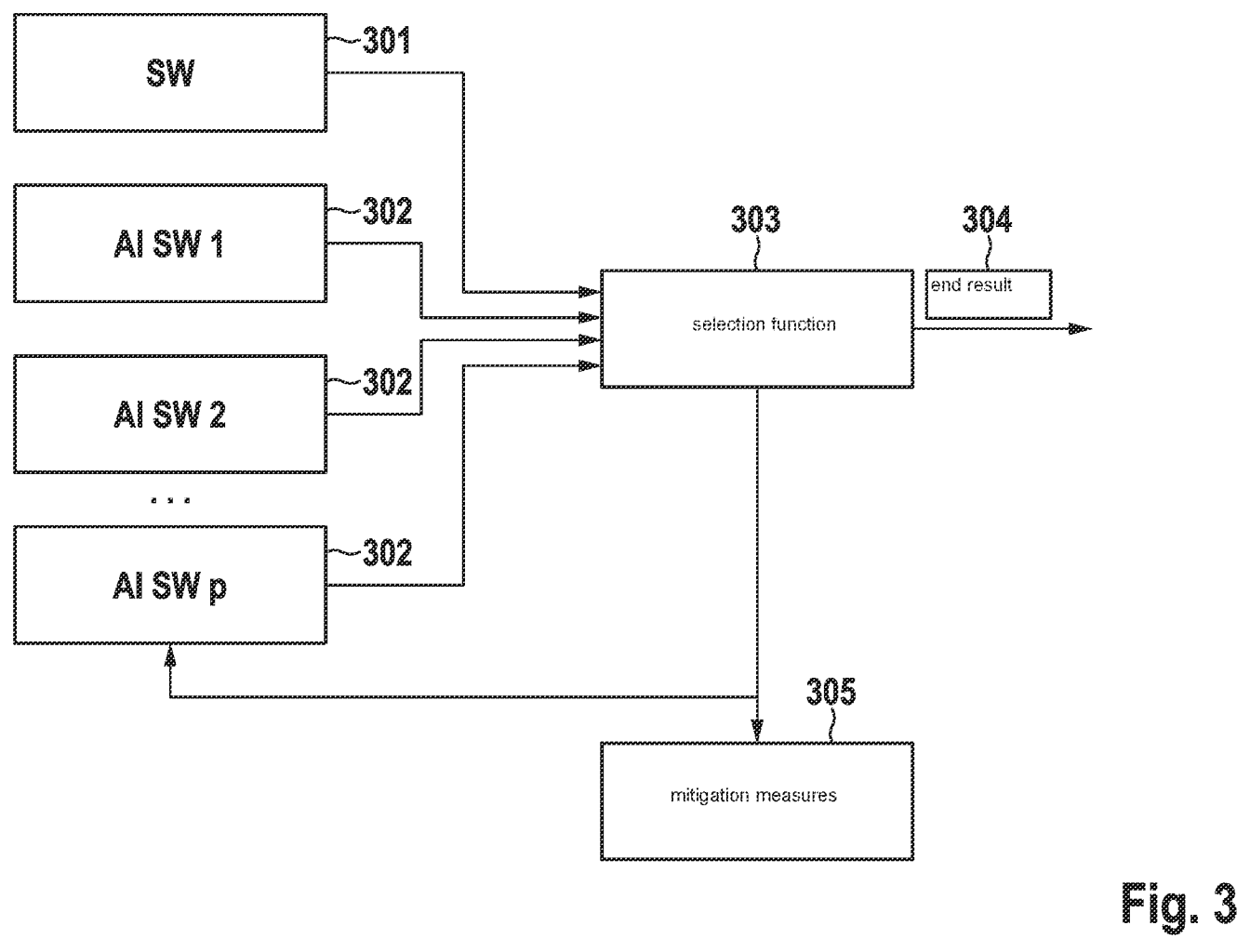

FIG. 3 illustrates the use of a human-generated computer program 301 in combination with AI-generated computer programs 302 (generated for the same task).

If the task is now to be performed, each computer program 301, 302 is supplied with the corresponding input (e.g., sensor data from a sensor on the vehicle, e.g., a camera or a radar sensor) so that each computer program 301, 302 generates a corresponding result, i.e., a processing result is generated for each processing path, wherein each processing path is formed by one of the computer programs 301, 302.

The control software 107 comprises a selection function 303 (also referred to as a "voter"), which selects a processing result from the processing results as the end result 304, wherein it weights the individual processing paths such that the processing result produced by the human-generated program 301 cannot erroneously be outvoted by (few, e.g., only one) processing results that are produced by the AI-generated programs, but that the processing result produced by the human-generated program 301 is nevertheless checked for plausibility. This increases the robustness of the control software (i.e., specifically the performance of the task) since errors in the human portion (human-generated program 301) can be discovered by the AI portion (AI-generated programs 302) and can also be mitigated by mitigation measures 305 in some circumstances. However, the additional effort is only marginally higher since a program can probably be generated with today's or future tools via AI from a task specification (e.g., requirement specification or textual function description) with little effort, in particular little subsequent manual verification steps.

In addition to AI-generated computer programs 202, in a crowd variant, it is also possible to give one or more further (e.g., external) software programmers (in a corresponding community) the option of developing a further ("crowd-generated") computer program for the task specification and to measure these computer programs against the human-generated (original) program 201 in comparison to one another by means of the selection function. In doing so, programming errors in the human-generated program 201 can be found (and in this case, the respective programmer(s) can be rewarded).

The human-generated computer program can be developed purely according to QM (quality management), i.e., only according to quality processes or according to a safety standard (e.g., ISO 26262, DO-254, ISO13849), but according to a lower safety integrity level than required by the associated safety target. The arguments of sufficient safety integrity of the overall software (i.e., human-generated computer program plus AI-generated computer programs) is derived, according to ASIL decomposition or a variation thereof, from the use of redundant, independent processing paths.

In this case, only the selection function 303 (which in particular functions as a comparator) has to meet the high safety integrity required at the system level and must be developed accordingly.

According to various embodiments, the selection function 303 weights the processing path of the human-generated computer program 301 more strongly than the processing paths of the AI-generated computer programs 302. For example, the selection function 303 weights the processing path of the human-generated computer program 301 (e.g., at 49%) such that the selection function 303 does not select the processing result of the human-generated computer program 301 as the end result 304 only if all (or at least almost all or the majority of) processing paths of the AI-generated computer programs 302 produce a processing result that contradicts the processing result of the human-generated computer program 301. If the selection function 303 does not select the processing result of the human-generated computer program 301, it can, for example, instead select a predefined safe starting value as the end result 303 or bring the respective system (e.g., the vehicle 101) into a safe state as the mitigation measure 305.

In this case, the criterion whether a processing result (or a processing path) contradicts another can depend on the task, in particular the type of the result. If the result is a decision (yes/no, such as braking or not braking or a lane change or no lane change), or a classification, two results contradict one another if they are not equal. If the processing result is, for example, a numerical value, tolerances may be provided (e.g., 24 km/h does not contradict 23 km/h but 30 km/h contradicts 23 km/h).

The selection function 303 may also average processing results of the AI paths (i.e., processing paths with AI-generated computer programs 302) and, if the deviation of the processing path with the human-generated computer program 301 from the average result is outside of a tolerance, the processing result of the human-generated computer program 301 is not selected by the selection function 303 as the end result 304. Instead, for example, the selection function 303 selects a predefined safe starting value as the end result 303 or brings the respective system (e.g., the vehicle 101) into a safe state as a mitigation measure 305. According to various embodiments, this is used in combination with the criterion that the number of computer programs among the second computer programs whose second processing result contradicts the first processing result is greater than the predetermined threshold so that it is avoided that a single AI-generated computer program that produces a processing result that very strongly deviates from the processing result of the human-generated computer program causes the safety measure to be initiated, e.g., the first processing result to be discarded. In other words, it can first be checked whether the number of computer programs among the second computer programs whose second processing result contradicts the first processing result is greater than the predetermined threshold and, if this is the case, it is checked whether the average of the second processing results deviates from the first processing result by more than a tolerance value and, if this is the case, the safety measure is initiated. Thus, in addition to the condition that the number of computer programs among the second computer programs whose second processing result contradicts the first processing result is greater than the predetermined threshold, conditions may be checked to decide whether the safety measure will be initiated.

The selection function 303 may also produce meta information, e.g., about the result of the selection or the number and properties of the processing paths involved in the selection. Deviations of the result of a processing path from the end result 304 can be reported back to the corresponding AI path or the programmer(s).

The processing paths of the AI-generated computer programs 302 may also be run parallel to the processing result of the human-generated computer program 301 in the sense of a shadow mode and may initiate (as a mitigation measure 305) that the human-generated computer program 301 is verified if the processing paths of the AI-generated computer programs 302 frequently contradict the processing result of the human-generated computer program 301 (even if it is not sufficient, for example, to outvote the human-generated computer program 301, i.e., to cause the selection function 303 to not select the processing result of the human-generated computer program 301 as the end result 304).

The selection function 303 may also disable a processing path of an AI-generated computer program 302 if this processing path has frequently produced a processing result that contradicted other processing paths (e.g., the majority of processing paths). This disabling may also only relate to the use of the processing path for the shadow mode. The AI tool that generated the computer program of this processing path may then also be retrained.

Processing paths can thus be updated. The number of processing paths may also vary (e.g., dynamically during operation of the control unit 107, e.g., depending on the current integrity requirement). For this purpose, it is only necessary to configure the selection function 303 accordingly (number of inputs, weighting of the inputs, error response).

The selection function 303 can be offered and utilized as a service in a (dynamic) cloud architecture. The AI tool(s) (or crowd-generated programs) may also be provided as a service.

Figure 4:
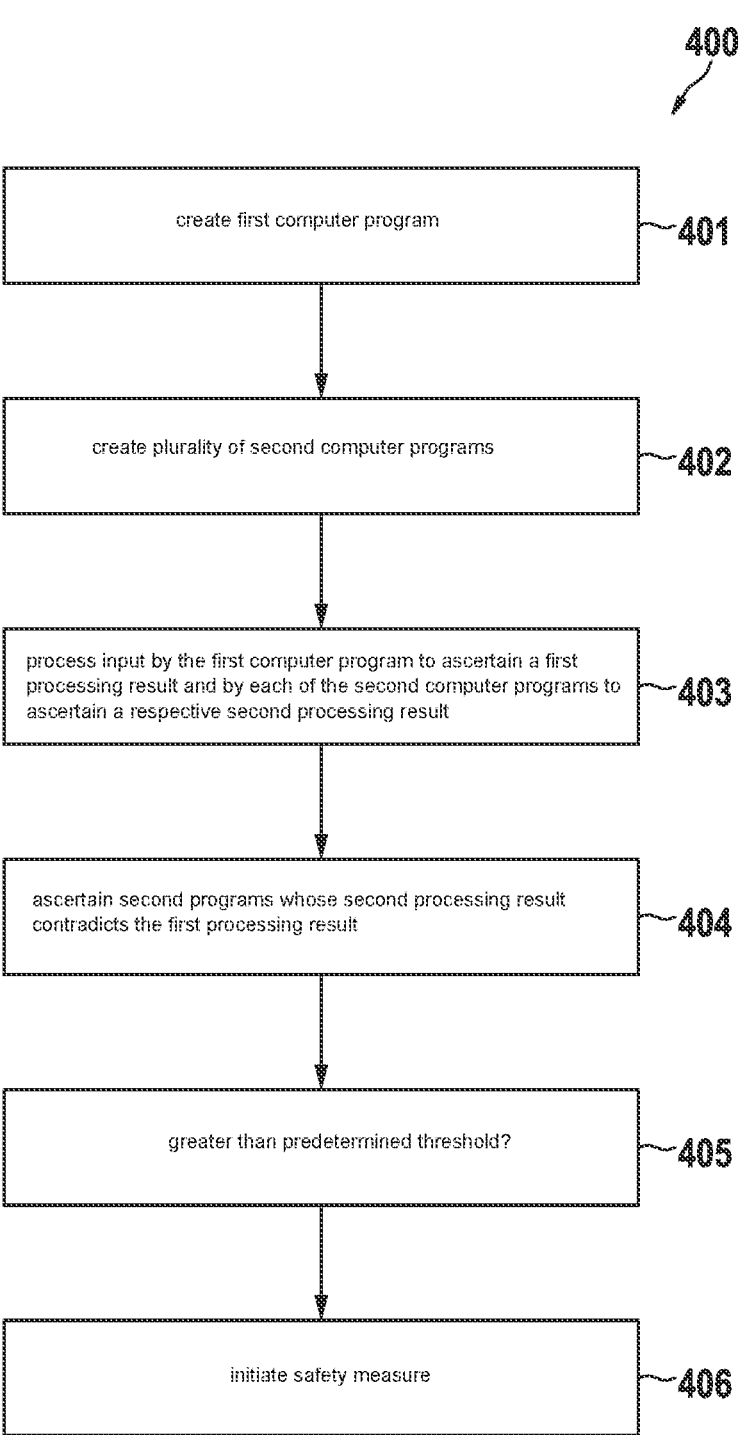
FIG. 4 shows a flowchart illustrating a method for carrying out data processing according to one example embodiment of the present invention.

In summary, according to various embodiments, a method as shown in FIG. 4 is provided.

FIG. 4 shows a flowchart 400 illustrating a method for carrying out data processing according to one embodiment.

At 401, a first computer program for a predetermined data processing task is created by one or more human programmers.

At 402, a plurality of second computer programs are created for the predetermined data processing task, wherein each of the computer programs is created by one (possibly a respective one, i.e., not necessarily the same) artificial intelligence (i.e., by an AI tool, AI module, or AI system).

At 403, an input is processed by the first computer program to ascertain a first processing result, and by each of the plurality of second computer programs to ascertain a respective second processing result.

At 404, a number of computer programs among the second computer programs whose second processing result contradicts the first processing result is ascertained.

At 405, it is checked whether the number of computer programs among the second computer programs whose second processing result contradicts the first processing result is greater than a predetermined threshold, which is greater than or equal to two.

At 406, a safety measure is initiated if the number of computer programs among the second computer programs whose second processing result contradicts the first processing result is greater than a predetermined threshold.

The method of FIG. 4 can be carried out by means of one or more computers comprising one or more data processing units. The term "data processing unit" may be understood to mean any type of entity that enables the processing of data or signals. For example, the data or signals can be processed according to at least one (i.e., one or more than one) specific function carried out by the data processing unit. A data processing unit may comprise or be formed from an analog circuit, a digital circuit, a logic circuit, a microprocessor, a microcontroller, a central processing unit (CPU), a graphics processing unit (GPU), a digital signal processor (DSP), an integrated circuit of a programmable gate assembly (FPGA), or any combination thereof. Any other way of implementing the respective functions described in more detail herein may also be understood as a data processing unit or logic circuitry. One or more of the method steps described in detail herein can be carried out (e.g., implemented) by one data processing unit by one or more specific functions executed by the data processing unit.

While the above exemplary embodiments were described with respect to carrying out a data processing task for controlling a vehicle, the above-described approach is not limited thereto but can be used for various processing tasks, in particular for a task that serves, in general, to generate a control signal for a robotic device (not necessarily a vehicle). The term "robotic device" may be understood as relating to any technical system (with a mechanical part whose movement is controlled), such as a computer-controlled machine, a vehicle, a household appliance, an electric tool, a manufacturing machine, a personal assistant, or an access control system. For example, a control rule for the technical system is learned, and the technical system is then controlled accordingly.

The task may include the processing of sensor data, e.g., sensor signals from various sensors, such as video, radar, LiDAR, ultrasound, movement, thermal imaging, etc. The task may, for example, comprise classifying the sensor data or carrying out a semantic segmentation, in order to detect the presence of objects (in the environment in which the sensor data were obtained), for example.

Although specific embodiments have been illustrated and described herein, the person skilled in the art recognizes that the specific embodiments shown and described may be substituted for a variety of alternative and/or equivalent implementations without departing from the scope of protection of the present invention. This application is intended to cover any adaptations or variations of the specific embodiments discussed herein.

What is claimed is:

1. A method for carrying out data processing, the method comprising:
   creating a first computer program for a predetermined data processing task by one or more human programmers, wherein the predetermined data processing task ascertains a processing result of a control signal for a robotic device;
   creating a plurality of second computer programs for the predetermined data processing task, wherein each of the computer programs is created by an artificial intelligence;
   concurrently performing:
      processing an input by the first computer program to ascertain a first processing result; and
      processing the input by each of the plurality of second computer programs to ascertain a respective second processing result;
   ascertaining a number of computer programs among the second computer programs whose second processing result contradicts the first processing result;
   checking whether the number of computer programs among the second computer programs whose second processing result contradicts the first processing result is greater than a predetermined threshold, which is greater than or equal to two;
   initiating a safety measure when the number of computer programs among the second computer programs whose second processing result contradicts the first processing result is greater than the predetermined threshold; and
   in response to the number of computer programs among the second computer programs whose second processing result contradicts the first processing result being greater than the predetermined threshold, performing, by the data processing system, a safety measure comprising: discarding the first processing result from a memory and using a predetermined safe default value as an end result control signal of the data processing, wherein the default value controls the robotic device into a safe state preventing any damage or hazard from occurring.

2. The method according to claim 1, further comprising using the first processing result as a result of the processing when the ascertained number is less than the predetermined threshold.

3. The method according to claim 1, further comprising:
   for each input of several inputs:
      processing the input by the first computer program to ascertain a first processing result for the input, and processing the input by each of the plurality of second computer programs to ascertain a respective second processing result for the input; and
      excluding one of the second computer programs from processing subsequent inputs, wherein the excluded second computer program has produced, for a number of inputs that exceeds a further predetermined threshold, a second processing result that contradicts the respective first processing result, wherein the number of computer programs among the second computer programs whose second processing result for the input contradicts the first processing result is not greater than the predetermined threshold.

4. The method according to claim 3, further comprising:
   re-training the artificial intelligence when one of the second computer programs has in each case produced, for a number of inputs of several inputs that exceeds the further predetermined threshold, a second processing result that contradicts the respective first processing result, although the number of computer programs among the second computer programs whose second processing result for the input contradicts the first processing result is not greater than the predetermined threshold.

5. The method according to claim 1, further comprising:
   for each input of several inputs,
      selecting a portion of the plurality of second computer programs;
      processing the input by the first computer program to ascertain a first processing result, and
      processing the input by each second computer programs of the selected portion to ascertain a respective second processing result;
      ascertaining a number of computer programs among the second computer programs of the selected portion whose second processing result contradicts the first processing result;
      checking whether the number of computer programs among the second computer programs of the selected portion whose second processing result contradicts the first processing result is greater than a predetermined threshold, which is greater than or equal to two; and
      initiating a safety measure if the number of computer programs among the second computer programs of the selected portion whose second processing result contradicts the first processing result is greater than the predetermined threshold.

6. The method according to claim 1, wherein the safety measure includes verifying a correct functioning of the first computer program.

7. A data processing system having a processor configured to:
   create a first computer program for a predetermined data processing task by one or more human programmers, wherein the predetermined data processing task ascertains a processing result of a control signal for a robotic device;

create a plurality of second computer programs for the predetermined data processing task wherein each of the computer programs is created by an artificial intelligence;

concurrently perform:

process an input by the first computer program to ascertain a first processing result, and process the input by each of the plurality of second computer programs to ascertain a respective second processing result;

ascertain a number of computer programs among the second computer programs whose second processing result contradicts the first processing result;

check whether a number of computer programs among the second computer programs whose second processing result contradicts the first processing result is greater than a predetermined threshold, which is greater than or equal to two;

initiate a safety measure if the number of computer programs among the second computer programs whose second processing result contradicts the first processing result is greater than the predetermined threshold; and in response to the number of computer programs among the second computer programs whose second processing result contradicts the first processing result being greater than the predetermined threshold, perform, by the data processing system, a safety measure comprising: discarding the first processing result from a memory and using a predetermined safe default value as an end result control signal of the data processing, wherein the default value controls the robotic device into a safe state preventing any damage or hazard from occurring.

8. A non-transitory computer-readable medium on which are stores instructions that, when executed by a processor, cause the processor to perform the following steps:

creating a first computer program for a predetermined data processing task by one or more human programmers, wherein the predetermined data processing task ascertains a processing result of a control signal for a robotic device;

creating a plurality of second computer programs for the predetermined data processing task, wherein each of the computer programs is created by an artificial intelligence;

concurrently performing:

processing an input by the first computer program to ascertain a first processing result, and processing the input by each of the plurality of second computer programs to ascertain a respective second processing result;

ascertaining a number of computer programs among the second computer programs whose second processing result contradicts the first processing result;

checking whether the number of computer programs among the second computer programs whose second processing result contradicts the first processing result is greater than a predetermined threshold, which is greater than or equal to two;

initiating a safety measure if the number of computer programs among the second computer programs whose second processing result contradicts the first processing result is greater than the predetermined threshold; and in response to the number of computer programs among the second computer programs whose second processing result contradicts the first processing result being greater than the predetermined threshold, performing, by the data processing system, a safety measure comprising: discarding the first processing result from a memory and using a predetermined safe default value as an end result control signal of the data processing, wherein the default value controls the robotic device into a safe state preventing any damage or hazard from occurring.

* * * * *